No. 884,636. PATENTED APR. 14, 1908.
C. L. BUCKINGHAM.
SUBMERGED ORE CONCENTRATOR.
APPLICATION FILED FEB. 25, 1907.
4 SHEETS—SHEET 1.
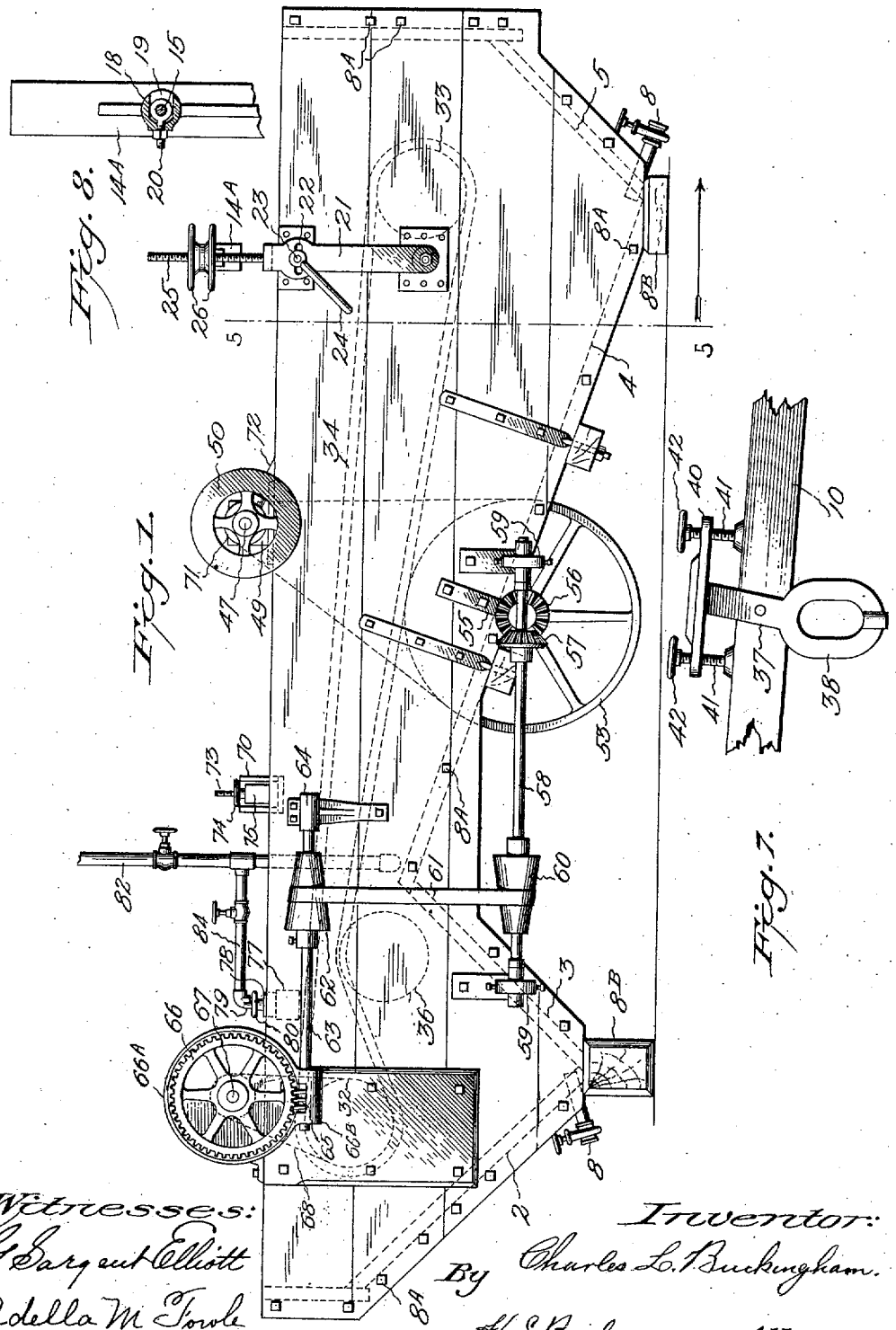

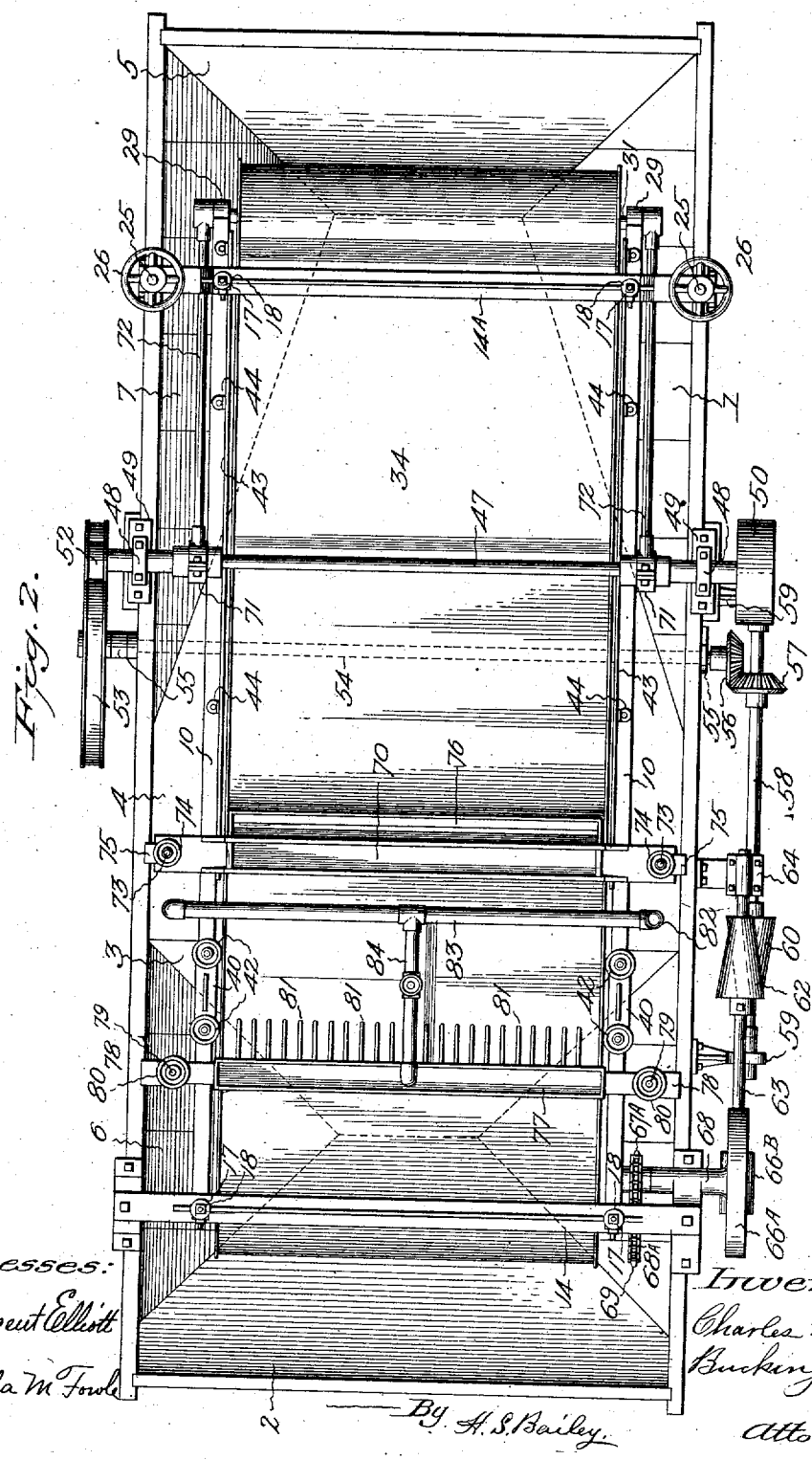

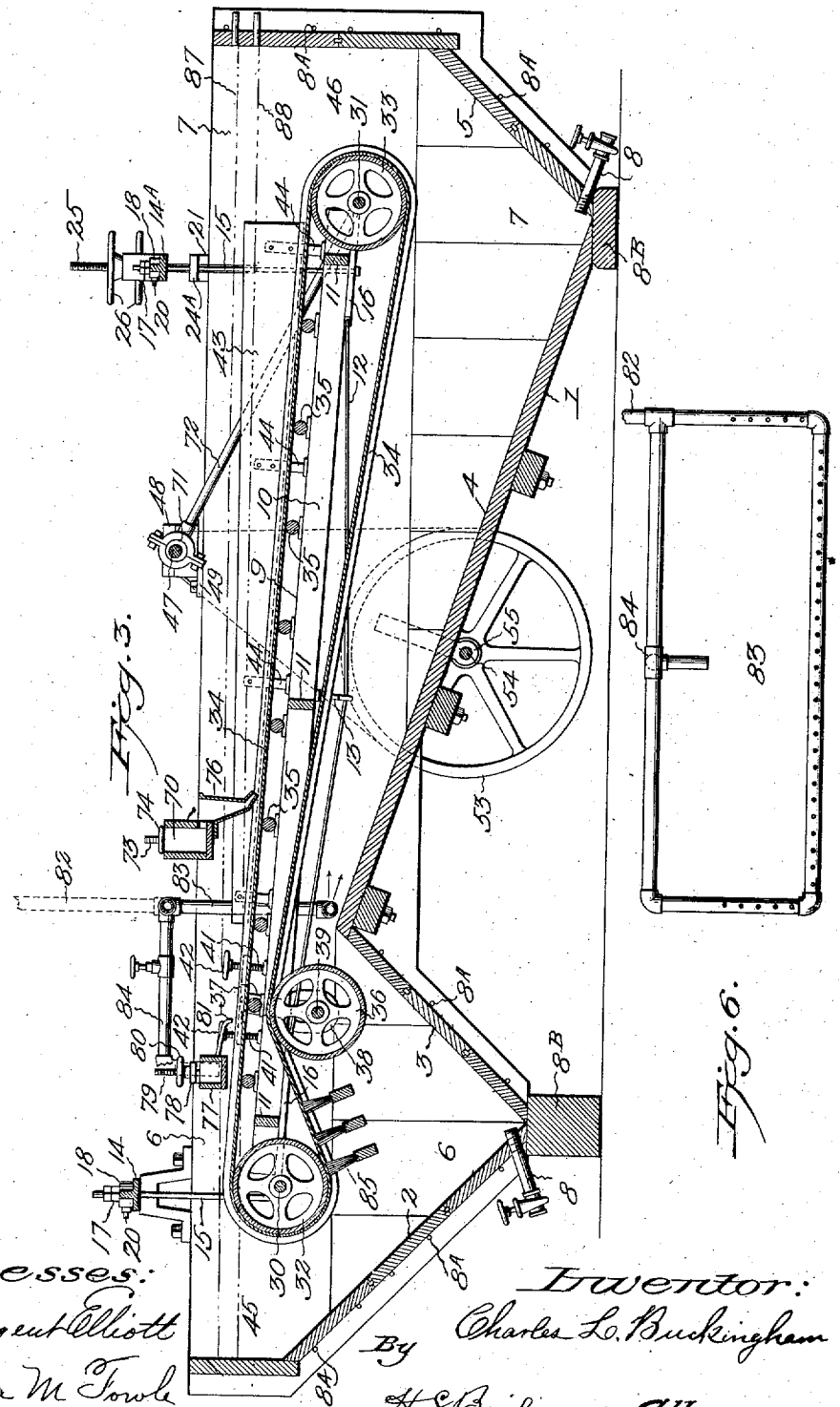

No. 884,636. PATENTED APR. 14, 1908.
C. L. BUCKINGHAM.
SUBMERGED ORE CONCENTRATOR.
APPLICATION FILED FEB. 25, 1907.
4 SHEETS—SHEET 4.
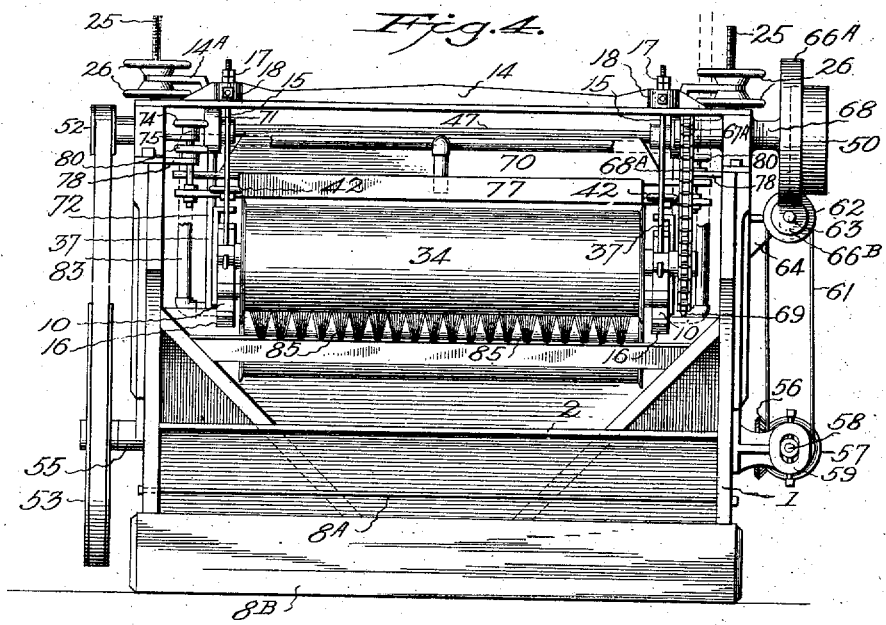
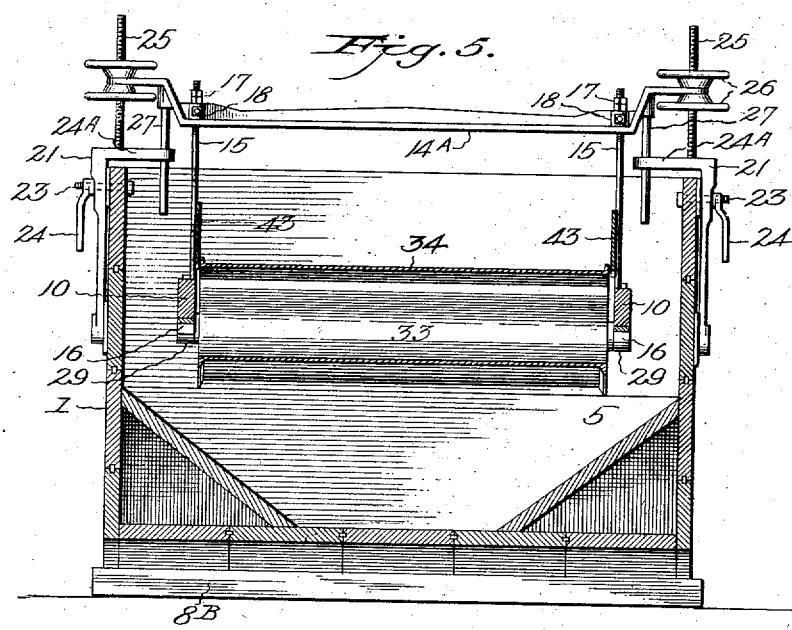
Witnesses:
G. Sargent Elliott
Adella M. Towle
Inventor:
By Charles L. Buckingham
H. S. Bailey. Attorney

UNITED STATES PATENT OFFICE.

CHARLES L. BUCKINGHAM, OF DENVER, COLORADO, ASSIGNOR OF ONE-HALF TO ROBERT B. McCONNEY, OF DENVER, COLORADO.

SUBMERGED ORE-CONCENTRATOR.

No. 884,636.

Specification of Letters Patent.

Patented April 14, 1908.

Application filed February 25, 1907. Serial No. 359,209.

*To all whom it may concern:*

Be it known that I, CHARLES L. BUCKINGHAM, a citizen of the United States of America, residing at the city and county of Denver and State of Colorado, have invented a new and useful Submerged Ore-Concentrator, of which the following is a specification.

My invention relates to improvements in concentrators, and the objects of my invention are: first, to provide a concentrator adapted to concentrate ore, and which may be either wholly or partially submerged in a body of water. Second, to provide an endless traveling belt concentrator adapted to be reciprocated and operated under water or a water fluid or chemical solution. Third, to provide a new submerged ore concentrator and slimer of the endless traveling belt type. Fourth, to provide a new ore concentrator and slimer adapted to separate ore from waste under a body of practically stationary water. Fifth, to provide a new and submerged ore concentrator and slimer, in which the pulp is fed under the surface of the water, through which stationary water the pulp settles upon and is stratified by the reciprocation of the concentrating surface. And Sixth, to provide a new and submerged ore concentrator and slimer in which the pulp is fed under the surface of the water, utilizing the vibration of the water caused by the operation of the machine to expedite the settling of the fine suspended pulp upon the concentrating surface when the pulp is stratified and separated by the concentrating surface. I attain these objects by the mechanism illustrated in the accompanying drawings, in which:

Figure 1, is a side elevation of my submerged endless traveling belt concentrator. Fig. 2, is a plan view of Fig. 1. Fig. 3, is a vertical, longitudinal, sectional view of the concentrator. Fig. 4, is an elevation of the forward end of the concentrator, a portion of the end of the tank being removed to afford an unobstructed view of the belt and supporting means. Fig. 5, is a transverse, vertical, sectional view, on the line 5—5 of Fig. 1, looking in the direction of the arrow. Fig. 6, is a view of the water supply pipe which surrounds the belt. Fig. 7, is a side view of the adjustable hanger, which supports the belt-tightening roll. And Fig. 8, is a plan view partially in section of a portion of one of the supporting beams, showing an eye-bolt for clamping the concentrator supporting rods.

Similar letters of reference refer to similar parts throughout the several views.

Referring to the drawings, the numeral 1, designates a water tank, which is made large enough to hold my endless traveling belt concentrator. This tank may be constructed of any suitable material, and may be of any suitable shape. I have illustrated the tank constructed of wooden planks tongued and grooved together, and I preferably make it rectangular in shape and shape its bottom floor portion into inclined angled portions 2, 3, 4, and 5, which are arranged to form two independent settling compartments 6 and 7, the sides of which also converge towards the center of the tank, thus forming square pyramidal shaped hoppers at opposite ends of the tank, at the bottoms of which suitable discharge valves 8 are placed. The tank is firmly bolted together by bolts 8ᴬ, which extend transversely across the tank close to its end and bottom portions through the ends of its sides, and suitable foundation supporting timbers 8ᴮ are arranged under it to support it.

9 designates the supporting frame of my endless traveling belt concentrator. This frame consists of the side rails 10, and the cross or transverse tie pieces 11. A truss rod 12 is preferably placed under each side rail of the frame, the ends of which extend to and are supported at the end portions to the ends of the side pieces, and a saddle 13 is placed between the center of each truss rod and the side pieces. This concentrator supporting frame is suspended in the tank upon vertical rods 15, which depend from cross beams 14 and 14ᴬ, which are supported at opposite end portions of the tank, these rods being connected at their lower ends to castings 16, which are secured to the ends of the frame, and which are provided with bearings for the shafts of the belt drums. The upper ends of the rods 15 extend through apertures in the beams and are threaded, and nuts 17 are threaded to them to bear on top of lugs 18, positioned adjacent to the ends of web members formed on the top of the beams. A recess 19 is formed in each lug, as shown in Fig. 8, and an eye bolt 20 is placed in each recess, the rods 15, extending through said bolts, the bolts extended through the lugs of the beam, and to each eye bolt a nut is threaded, the eye bolts being adapted to clamp the rods rigidly to the beam to prevent any swaying movement in them. The vertical adjustment of the cross beam 14^A is adapted to raise and lower the rear end of the concentrator in the tank as desired, and while there are a number of ways in which this vertical adjustment may be effected, I preferably carry out this feature of my invention in the following manner: To the opposite sides of the rear end of the tank I secure brackets 21, the lower ends of which are pivotally bolted to the tank; intermediate of the ends of each bracket I form a horizontal slot 22, through which a bolt 23 is inserted, and which extends through the side of the tank and is provided with a handle nut 24, by which the bracket is clamped. This arrangement enables me to adjust the bracket to the desired vertical positions in setting up and operating the concentrator.

The brackets 21 are formed with a right-angled arm 24^A, from which threaded rods 25 project vertically. The opposite ends of the cross beam 14^A are slidably mounted on these threaded rods and hand clamping nuts or wheels 26 are threaded to the rods and positioned on opposite sides of the ends of the cross beam, and to the ends of the cross beam smooth rods 27 are secured, the opposite ends of which extend loosely through apertures formed in the ends of the arms 24^A of the brackets. These rods 27 act as guides and supports for the cross beam. Upon the opposite ends of the concentrator frame I secure the castings 16, having bearing boxes 29, in which are rotatably journaled shafts 30 and 31, upon which are secured belt drums 32 and 33, and around these drums I place an endless concentrating belt 34, of rubber or other suitable material. The top portion of this belt is held in a straight practically-level plane by a plurality of small rollers 35, which are placed at short distances apart under it, and are journaled in boxes secured to the top edges of the side rails of the concentrator frame. In order to maintain the belt at a proper degree of tautness, I place a vertically-adjustable belt supporting idler drum 36 below its lower portion, preferably arranging this feature in the following manner: to the outside of the forward ends of the belt supporting frame 9, I pivotally bolt a pair of shaft hangers 37, intermediate of their ends, and in the boxes 38 of the hangers a shaft 39 is journaled, on which said drum 36 is mounted; the upper ends of these hangers are each provided with a right-angled arm 40, in the form of a T, which are arranged to project in opposite directions from the hanger along the length of and at a short distance above the side rails of the concentrator frame, and through the ends of the arms I form threaded apertures through which I extend threaded rods 41, the lower ends of which rest on the top edges of the side rails of the frame, and the upper ends of which are provided with hand wheels 42, which permit the rods to be screwed through the arms against the side rails, causing the hangers to be tilted on their pivotal bolt, towards or from the adjacent end drum. Along the greater portion of the side edges of each side of the concentrating belt, I place a splash board 43, supporting them in position by vertical brackets 44, which are secured to the top edges of the side rails of the concentrator frame.

The concentrating belt and its supporting frame is preferably arranged to stand at a horizontally-inclined angle from the head end 45 of the belt, downwardly to its tailings discharge end 46. A continuous traveling movement is imparted to the belt through the medium of a main driving shaft 47, which extends across the tank and is journaled in boxes 48, formed in brackets 49, which are secured to and project above the sides of the tank. A driving pulley 50 is mounted on one end of this shaft, which is connected by a belt to a source of rotative power. The opposite end of the driving shaft is provided with a small pulley 52, which is connected by belt to a large driving pulley 53, that is mounted on one end of a shaft 54, that extends across the under side of the bottom of the tank and is journaled in boxes 55, that are formed in the ends of brackets that are secured to the sides of the tank. The opposite end of this shaft is provided with a bevel gear 56, which meshes with a bevel gear 57, that is mounted on a shaft 58, that extends along the side of the tank at right angles to the shaft 54, and is journaled in boxes 59, which are secured to the adjacent side of the tank. A tapering or cone pulley 60 is mounted on the shaft 58, and is connected by a belt 61 to an oppositely-tapered core pulley 62, which is mounted on a shaft 63, which extends parallel with the shaft 58, one end of the shaft 63 being journaled in a box 64, which is secured to the side of the tank. A worm pinion 65 is mounted on the opposite end of the shaft, which meshes with a worm gear 66, that is mounted on one end of a short shaft 67, which is journaled in a bracket 68 that is secured to the upper edge of the adjacent side of the tank. The worm gear 66 is inclosed in a housing 66^A, formed integral with the bracket 68, and the end of the shaft 63, having the worm pinion 65, is supported in a bearing 66^B, formed on the lower portion of this housing. On the opposite end of the shaft 67, I secure a sprocket pinion 67^A which is connected by a sprocket chain 68 to a sprocket wheel 69, that is mounted on the adjacent end of the concentrating belt's drum supporting shaft 30, which is rotated and rotates the drum and feeds the belt with a slow even continuous feeding movement in the upward direction of its inclination towards the head end of the belt.

The traveling speed of the concentrating belt varies to suit the operator by shifting the belt on the tapering or cone pulleys, which will increase or diminish it as the belt is moved from one end of the cones to the other. The concentrating belt and frame is also arranged and adapted to reciprocate longitudinally of its length, while concentrating ore with a short reciprocative vibratory or trembling movement. This vibratory movement may be imparted to the belt and its supporting frame by any suitable reciprocative motion producing mechanism, but I preferably carry out this feature of my invention in the following manner: On the opposite ends of the shaft 47 I mount eccentrics 71, from which eccentric rods 72 extend to and are journaled at their opposite ends to the ends of the shaft 31 of the belt's supporting drum 33. The pulley 50 mounted on the end of this shaft is belted to a source of rotative power as previously mentioned. These eccentrics are arranged with such a slight throw that a slight reciprocative vibratory movement is imparted to the concentrator belt and its frame which are permitted thus to swing reciprocally at the ends of their supporting rods.

Over the surface of the belt adjacent to its head end, I place an ore pulp feeding hopper 70, which extends transversely across the belt, and is adjustably supported by threaded rods 73, provided with hand wheel nuts 74, the rods being supported by brackets 75, which are secured to the opposite sides of the tank, the hand wheel nuts being threaded to said rods to bear on top of said brackets, and the lower ends of said rods being secured to said ore pulp feed hoppers, the adjustable rods enabling me to adjust the feed hopper at any desired height above the surface of the belt, and also to maintain it in a level position. This ore pulp feeding hopper is provided with suitable projecting feeding spout or distributer 76, which is adapted to feed and distribute the ore pulp across the table. Between this ore pulp hopper and the head end of the belt, I place just above the surface of the belt a clear water distributing hopper 77, which is also adjustably supported from brackets 78, which are secured to the sides of the tank, and adjustable threaded rods 79 and hand wheel nuts 80, which are arranged in the same manner as the ore pulp hopper. A row of water dripping fingers 81 is secured along the length of the water hopper and arranged to adjustably feed water across the surface of the belt.

A valve controlled water supply pipe 82 is supported in any convenient manner above the tank, and leads at one end to a supply of water under pressure, while its opposite end is connected to a loop 83, which extends around the belt and its supporting frame, as shown in Figs. 3 and 6. The bottom and side pipes of this loop are perforated, and furnish a supply of water to the tank. These perforations are next to the tailings end of the tank, and the fine jets of water which they form create a current, which carries the tailings matter in the water, away from the concentrates hopper and into the tailings hopper. A valve-controlled branch pipe 84 extends from the upper member of the loop to the water distributing hopper, and the tank is provided with a suitable over-flow outlet 84$^A$.

In the concentrator settling hopper of the tank I place a plurality of brushes 85, arranging them to bear against the surface of the belt between the head end belt drum and the belt's tightening drum. These brushes are secured in any suitable manner to the insides of the tank, and operate to brush the concentrates off the surface of the belt as the belt travels past them. A body of water or a watery fluid or any suitable chemical solution is kept in the tank, of sufficient volume to keep the concentrator belt either wholly or all but its head end or highest end portion submerged and under the surface of the water.

As my invention contemplates broadly the concentration of ore upon a concentrator either partially or wholly submerged below the surface of a body of water, I have illustrated in the tank two different water line levels 87 and 88. The water line level 87 represents the height of a body or volume of water in the tank sufficient to wholly cover the entire concentrator, while the water line 88 represents the height or volume of a body of water that is sufficient to cover all of the concentrator except a portion at and adjacent to its highest or head end, the surface of which extends to preferably a short distance below the clear water distributing hopper, thus enabling the ore pulp to be fed to the concentrator under water and to be fed out of the water by the upward travel of the belt, and be subjected to the washing action of the clear water of the water dripping fingers of the water hopper.

The operation of my submerged concentrator is as follows: The tank is filled with water enough to either wholly or only partially submerge and cover the concentrator, and the traveling belt, and the reciprocative vibratory movement mechanism are started up, which causes the belt to move with a slow even continuous movement from the lower end of the concentrator towards the head end, and at the same time a slight vibratory reciprocative movement is imparted to the belt or its frame under the water. The inclination of the belt is easily and quickly adjusted to suit the ore and size of ore pulp under treatment to permit the belt to make the best concentration possible. The ore pulp and clear water supply are then turned onto the belt and the ore pulp which is pulverized ore sand and water mixed into a running stream, is fed from the hopper through the distributing spouts across the surface of the belt under the surface of the water, although if desired the water level may be arranged relative to the point of contact of the ore on the belt so that the ore will feed onto the belt just above the water level on the belt, and as the supply of clear water washes down the belt it mingles with the water of the ore pulp and washes the ore pulp down the inclined surface of the belt, and into and under the water, and this action of the water, together with the rapid vibratory movement of the table, works the sands down the inclined surface of the table and off from its tailings discharge end, being guided down the belt through the body of water both by the side edges of the belt and also by the splash boards 43, from which they discharge into the body of water and settle into the tailings compartment or hopper of the tank, where they may be drawn off through the discharge valve in its bottom.

The tremor imparted to the water by the operation of the machine causes a rapid settling of the fine particles of ore pulp, which may be suspended in the water by the inflowing feed of pulp, and the inflowing feed of small jets of clear water from the clear water pipe that surrounds the sides and bottom portion of the belt; discharging into the body of water towards the tailings discharge compartment or hopper, causes a slight current of the water towards the lower end portion of the concentrator that keeps the float tailings material from flowing into the concentrates hopper. The mineral particles in the ore sands as they move down the belt under the rapid vibratory action of the belt settle down through the sands onto the surface of the belt, to which they cling by frictional gravity, and which carries them towards the head and high end of the belt through the wash water, which is adapted to wash from them such sand particles as remain among them, and they are carried by the continuous traveling movement of the belt over the head and belt supporting drum and in contact with the brushes at its under side, which brush them off into the body of water, and they settle into the concentrate compartment or hopper of the tank, where they may be drawn off when desired through the discharge valve in its bottom.

While I have illustrated and described the preferred construction of my submerged ore concentrator, I do not wish to be limited to the arrangement herein illustrated and described, as many changes might be made in its various features without departing from the spirit of my invention, which contemplates broadly a concentrator operatively arranged and adapted to concentrate ore either wholly or partially submerged in and below the surface of a body of water or of a watery fluid or of any suitable chemical solution.

Having described my invention, what I claim as new and desire to secure by Letters Patent, is:

1. A submerged concentrator, comprising a tank adapted to contain a body of water, an inclined endless traveling belt concentrator suspended in said tank, means for adjustably raising and lowering said belt, an adjustable speed driving mechanism operatively connected to said endless belt concentrator and arranged to feed it continuously towards its highest or head end in said tank, a reciprocating movement mechanism connected to said concentrator and arranged to impart a rapid reciprocative vibratory movement to said concentrator, means for feeding ore pulp to said concentrator, splash boards on opposite sides of said belt adapted to confine the feeding ore to said belt, means for feeding clean water to said concentrator, and means for regulating the height of said body of water to wholly or partially cover said concentrator.

2. In a submerged concentrator the combination of the tank adapted to contain a body of water, standards pivotally connected at their lower ends to the opposite sides of said tank, having slots extending transversely of their length and positioned intermediate of their ends, hand operating screws arranged to extend through said slots and adjustably clamp said standards to the sides of said tank, and means including threaded rods connected to said standards for supporting an operative ore treating concentrator in said tank.

3. In a submerged concentrator the combination with the tank adapted to contain a body of water, an operative ore treating concentrator submerged in the water of said tank, the side standards arranged to be pivotally moved to adjust said concentrator and provided with the threaded rods, the hand wheel nuts on said rods, with the beams extending across said tank adjacent to its opposite ends, one of which is slidably supported on said threaded rods by said hand wheel nuts, and provided with guides connected with said standards, rods depending from said beams into said tank and connected to the ends of said concentrator.

4. In a submerged concentrator the combination of the tank adapted to contain a body of water and with vertically arranged pivotally adjustable standards having vertically projecting threaded rods provided with hand wheel nuts, of beams extending across the end portions of said tank above it one of which is slidably supported on said threaded rods between said hand wheel nuts, a pair of rods depending from the opposite side portions of said beams into said tank, an operative endless traveling belt concentrator connected to the lower ends of said rods to swing reciprocally thereon, and immersed either wholly or partially in said body of water in said tank, and means connected to said tank for feeding said belt and for imparting a reciprocative vibratory motion to said concentrator.

5. In a submerged concentrator, the combination of a tank adapted to contain a body of water or watery fluid, a suitable concentrating surface suspended in said tank, means including a hopper for feeding ore pulp under the surface of the fluid and directly onto the concentrating surface, splash boards to confine the ore pulp to the concentrating surface, means for reciprocating the concentrating surface and stratifying the pulp, two separated hoppers arranged in said tank below said concentrating surface, means for conducting the mineral portion of the pulp to one hopper and the waste portion to the other hopper, means for drawing the concentrated mineral particles from one hopper, means for drawing the waste pulp from the other hopper, and means for producing a flow of water under pressure in the main body of water away from the concentrates hopper towards the waste pulp hopper, for moving the material in suspension in the water in said tank.

6. In a submerged concentrator the combination of a tank adapted to contain a body of water and having a tailings discharge hopper and a concentrates hopper in its bottom, a concentrator submerged in said tank in said body of water and a clear water discharge pipe arranged to extend down the sides of said concentrator and underneath it, across said tank in said body of water, provided with a row of small perforations in said pipes arranged to face towards the tailings hopper of said tank and adapted to discharge a plurality of small water jets into said body of water in said tank, and a water overflow discharge pipe in said tank.

7. In a submerged concentrator the combination of the tank adapted to contain a body of water and having a concentrating hopper and a tailings hopper on its bottom, with a concentrator suspended in said tank and submerged in said water, a clear water supply pipe surrounding said concentrator transversely between said hopper and partially immersed in said body of water and provided with a plurality of small apertures in its submerged portion adapted to discharge jets of water into the tailings hopper of said tank.

8. In a submerged concentrator, a tank adapted to contain a body of water, an adjustable traveling endless belt concentrator submerged below the water in said tank, means including a hopper for feeding ore-pulp below the water level onto said endless concentrating belt, means for gently agitating said belt and water, means for concentrating the ore pulp in said gently agitated body of water, a waste hopper and a concentrated mineral receiving hopper in said tank below said concentrator, and means for producing a flow of water under pressure in the main body of water away from the concentrates hopper towards the waste pulp hopper to move the ore pulp in suspension in said body of water away from said mineral hopper and toward said waste hopper.

9. In a submerged concentrator, a tank adapted to contain a body of water, an operative concentrator arranged to extend below the water level, and means for rapidly vibrating said concentrator and said body of water to give to both a trembling motion, means for feeding ore pulp under the level of the water and through the water directly onto said concentrator, means including splash boards in said tank and water for confining said ore pulp to said concentrator, means for concentrating ore pulp in said slightly-trembling body of water on said vibrating concentrator, means for settling the concentrated mineral particles of said ore pulp at one end of the bottom portion of said tank below said concentrator, and the tailings product of said ore pulp at the opposite end of said tank below said concentrator, and means including a perforated pipe arranged in said tank under said concentrator in said water and adapted to discharge a plurality of jets of water into the body of water below said concentrator and adapted to cause a current of water to flow from the points intermediate the concentrates settling and the tailings settling portions of the tank.

In testimony whereof I affix my signature in presence of two witnesses.

CHARLES L. BUCKINGHAM.

Witnesses:
G. SARGENT ELLIOTT,
ADELLA M. FOWLE.